March 17, 1970 J. W. METCALF 3,500,858
MOUNTING STRUCTURE FOR A VEHICLE FUEL TANK SENDING UNIT
Filed June 27, 1967 2 Sheets-Sheet 1
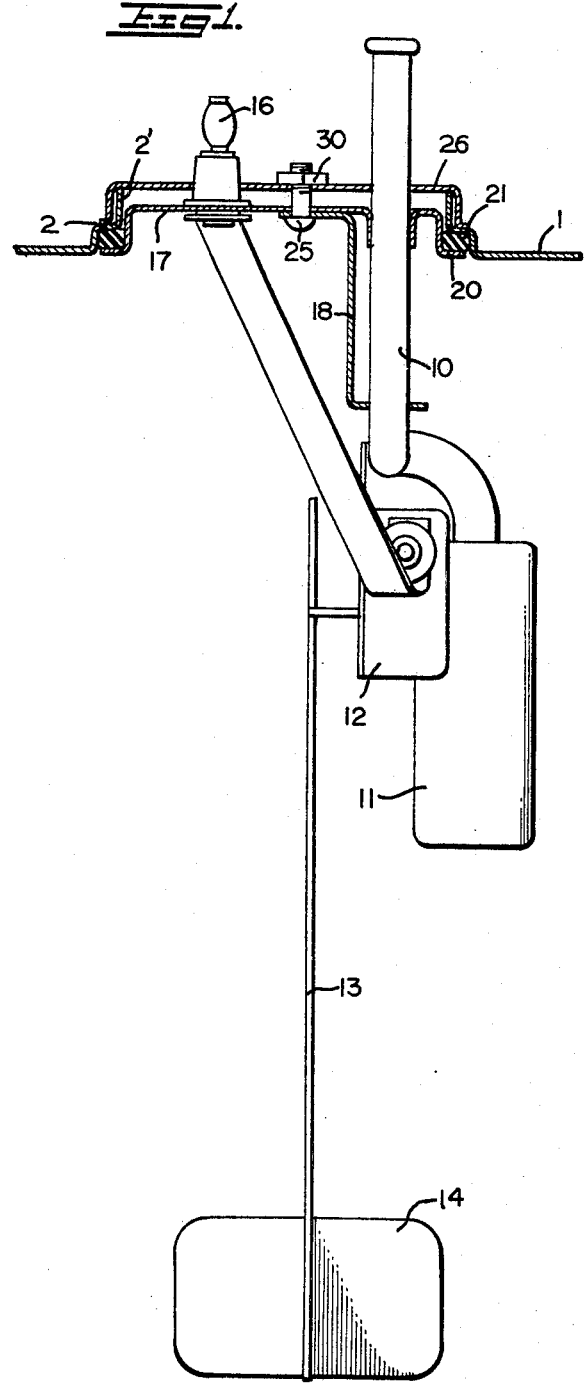
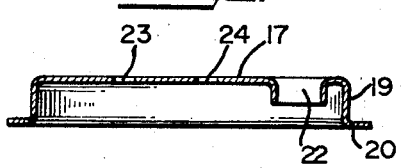
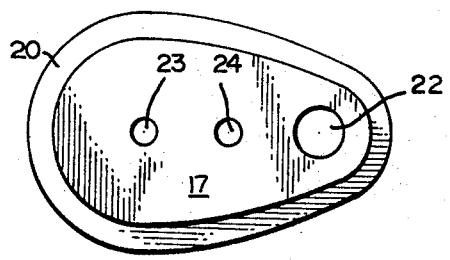
INVENTOR
JOHN W. METCALF
BY Blaylock, Downing & Seebold
ATTORNEY

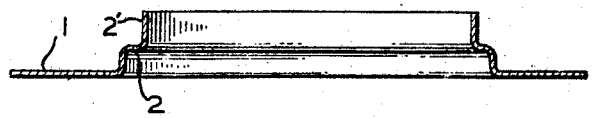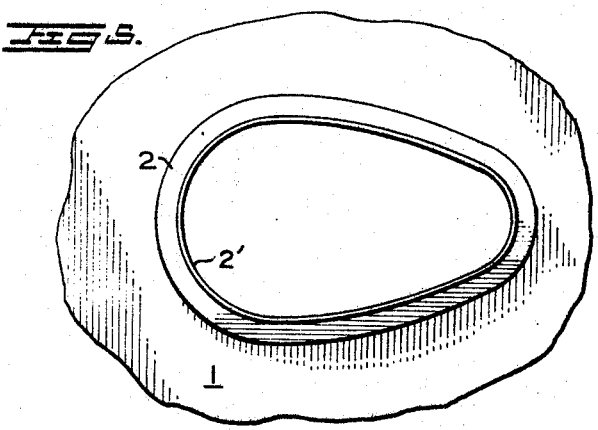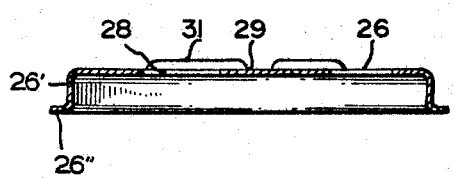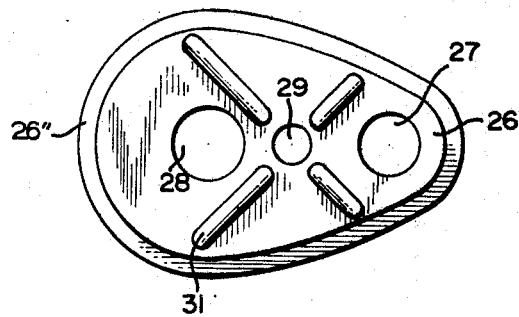

United States Patent Office 3,500,858
Patented Mar. 17, 1970

3,500,858
MOUNTING STRUCTURE FOR A VEHICLE
FUEL TANK SENDING UNIT
John W. Metcalf, 2728 Emmaus Ave., Zion, Ill. 60099
Filed June 27, 1967, Ser. No. 649,294
Int. Cl. B60k 15/02; G01f 23/06; B65d 25/56
U.S. Cl. 137—560                                5 Claims

ABSTRACT OF THE DISCLOSURE

A mounting device for a vehicle fuel tank sending unit wherein the tank is provided with an egg-shaped aperture. An internally positioned mounting plate and gasket, also egg-shape, are held against the inner surface of the tank by a similarly shaped externally positioned pressure cap and a nut and bolt drawing the plate and cap together. A fuel pipe and electrical connection extend through the device into the tank.

---

It is the present practice to weld the sending equipment into the tank at the time of fabrication of the tank. This procedure requires welding equipment, jigs and fixtures and introduces the hazard of producing scrap in case of defective workmanship on the part of the welder.

By use of the mounting of the present invention it is possible to mount the sender in a part to be later assembled with the tank. It will be noted that this makes it possible to easily mount the sender in a non-metallic fuel tank which could not be done where the sender parts are welded to the tank.

It is an object of the present invention to provide a means so that the sender can be mounted at a bench to assure good workmanship. The bench assembled sender can be inspected and, in case of assemblies that are not up to standard, may be reworked without substantial loss of material and labor as the fuel tank is not involved.

It is a further object of the invention to make a sender mounting so that mounted senders may be assembled and held in stock for use in fuel tanks of different shapes as used by different vehicle manufacturers.

Other and further objects and advantages will appear from the following specification taken with the accompanying drawings, in which like reference characters refer to similar parts in the several views, and in which:

FIGURE 1 is a view partly in section of a sender mounted in a tank in accordance with the present invention, FIGURE 2 is a section of the element of the invention on which the sender is mounted, FIGURE 3 is a plan view of the element of FIGURE 2, FIGURE 4 is a section of a tank showing the portion of the tank to receive the sender, FIGURE 5 is a plan view of FIGURE 4, FIGURE 6 is a section of a cover element, and FIGURE 7 is a plan view of the cover element of FIGURE 6.

As seen in FIGURE 1, the sender unit includes a fuel line 10 on which is mounted a strainer 11, the box 12 in which the gauge element itself is housed, the details of which are of no interest here as they are well known in the gauge art, and per se form no part of the present invention, float arm 13 and float 14 by which the gauge 12 is actuated, and an electrical conductor 15 that leads to a slip joint or connector 16 for a wire connection by which the gauge reading may be transmitted to the instrument panel of a vehicle.

It will be noted that the fuel line 10 is securely soldered or welded to the mounting element 17 where it passes therethrough, and is also braced by a bracket 18 secured to element 17. The securement between the element 17 and the gauge device is, therefore, very strong.

Mounting element 17 is egg-shaped in plan and is provided at its periphery with a downwardly extending portion 19 at the lower edge of which is an outwardly extending flange 20 on which a sealing gasket 21 is seated.

The aperture 22 through which the fuel pipe 10 passes is preferably flanged to give a good strong support for pipe 10. An aperture 23 is provided to receive the electrical connection 16 which must, of course, be insulated, and an aperture 24 is shown to receive bolt 25. Conveniently the bolt 25, bracket 18 and element 17 may all be soldered, welded or brazed together to assure tightness against the possibility of leakage of fuel.

It will be seen then, that all of the elements of the sender can be assembled in or on element 17 at a work bench in the shop, assuring tight joints and providing for easy inspection.

Mounted on the bolt 25 is a pressure cap 26 having an aperture 27 to accommodate fuel pipe 10, an aperture 28 to accommodate electrical connection 16, and an aperture 29 to receive the bolt 25. Nut 30 bears against the outer face of cap 26, when the sender is installed, to clamp and seal the gasket 21 against the edge 2 of the aperture in tank 1.

The tank 1 is provided with an egg-shaped aperture surrounded by an upstanding flange 2, 2′. The pressure cap 26 has a flanged depending edge that bears on the top side of flange 2 to pull the element 17 upwardly when nut 30 is tightened on bolt 25 so that the gasket 21 is compressed against the inner side 2 of the tank immediately below flange 2′.

The connections to the sender both for fuel line 10 and electrical connectors 16 may be made after the sender is installed on the tank just as though the sender had been built into the tank during fabrication of the tank.

It will be seen that the egg-shape for the element 17 not only permits assembly of the device at a bench, but assures correct installation in the tank as the assembly will necessarily, when "buttonholed" into the aperture in the tank, be positioned with the fuel pipe 10 at the small end of the egg-shaped opening in the tank, and the electric connections at the larger end. Other locations of these elements in the element 17 could be used but, in any case, the pipe and electrical connections, and therefore the float and other elements of the unit, will be properly located. The egg-shape also provides the smallest opening in the tank through which the device, including element 17, can be installed.

Radial ribs 31 may be stamped into compressor plate 26 to strengthen it against the pull of bolt 25 and nut 30 to assure a uniform compression of gasket 21. The edge of element 26 is provided with a downwardly extending rim 26′ having an outwardly extending bottom flange 26″.

By the present invention the manufacture of completed tanks is simplified and rendered less expensive, as special jigs and fixtures to weld the sender into the tank are not required. Also, scrap of tanks will not be caused because of burning the tanks in the welding process. So by eliminating both special equipment and by saving the employee's time by substituting the simple process of welding the sender to element 17, for the arduous process of welding the sender directly into the tank, both a less expensive and a more reliable installation is accomplished. Furthermore, by the present invention senders may be replaced in the fuel tank without replacement of the entire tank, and the sender unit of the present invention can be used on tanks of any material, plastic as well as metal.

What is claimed is:

1. A mounting for a vehicle fuel tank sender to be mounted in an egg-shaped opening in a vehicle fuel tank, said mounting comprising a mounting plate of slightly larger size than, and of a complementary shape, to said egg-shaped opening, a peripheral flange on said mounting plate and extending outwardly thereof, an egg-shaped gasket supported by said flange for placement in underlying relation or against the inner surface of said tank at the periphery of said opening upon insertion of the mounting plate in the opening, a fuel pipe extending through and sealed to said mounting plate, an electrical connection extending through and sealed to said mounting plate, an egg-shaped pressure plate overlying said mounting plate, an outwardly extending peripheral flange on said pressure plate dimensioned to overly a portion of the outer surface of the tank at the periphery of the opening, apertures in said pressure plate for passage of said fuel pipe and said electrical connection, a central aperture in said pressure plate, a bolt secured centrally of said mounting plate and extending through and beyond said central aperture in said pressure plate, and nut means cooperable with said bolt to draw said mounting plate toward said pressure plate and apply the flange on said pressure plate against the outer surface of the tank and said gasket against the inner surface of said tank with said flanges on said mounting plate and pressure plate applying a flat even pressure around the entire opening.

2. A mounting for a vehicle fuel tank as claimed in claim 1 and a bracket secured between the underside of said mounting plate and said fuel pipe to maintain the position of said fuel pipe relative to said mounting plate.

3. A mounting unit as claimed in claim 1 in which the inner periphery of the opening is defined by an inwardly directed flange disposed above the adjacent surface of the tank, said mounting plate having a depending peripheral portion to fit within the opening, said peripheral flange on said mounting plate extending outwards from the lower end of said depending peripheral portion and underlying said inwardly directed flange that defines the opening, said pressure plate having a depending peripheral portion and said outwardly extending peripheral flange on said pressure plate extending outwardly of the lower end of said last-mentioned depending peripheral portion and overlying said inwardly directed flange.

4. A mounting for a vehicle fuel tank as claimed in claim 3 and said pressure plate having strengthening ribs thereon extending radially of said central aperture.

5. A mounting for a vehicle fuel tank as claimed in claim 3 and said mounting plate including a depending sleeve portion surrounding a portion of said fuel pipe.

References Cited

UNITED STATES PATENTS

| | | | |
|---|---|---|---|
| 2,283,066 | 5/1942 | Ingersoll | 220—25 |
| 2,550,751 | 5/1951 | Adams | 220—25 X |
| 3,173,469 | 3/1965 | Shockey | 137—590 |
| 3,381,709 | 5/1968 | Pregno | 137—578 |

M. CARY NELSON, Primary Examiner

W. R. CLINE, Assistant Examiner

U.S. Cl. X.R.

137—590; 220—25